Nov. 7, 1967
J. H. WYMAN
3,351,198
GLASS CONTAINER SORTING
Filed Feb. 25, 1965
5 Sheets-Sheet 1
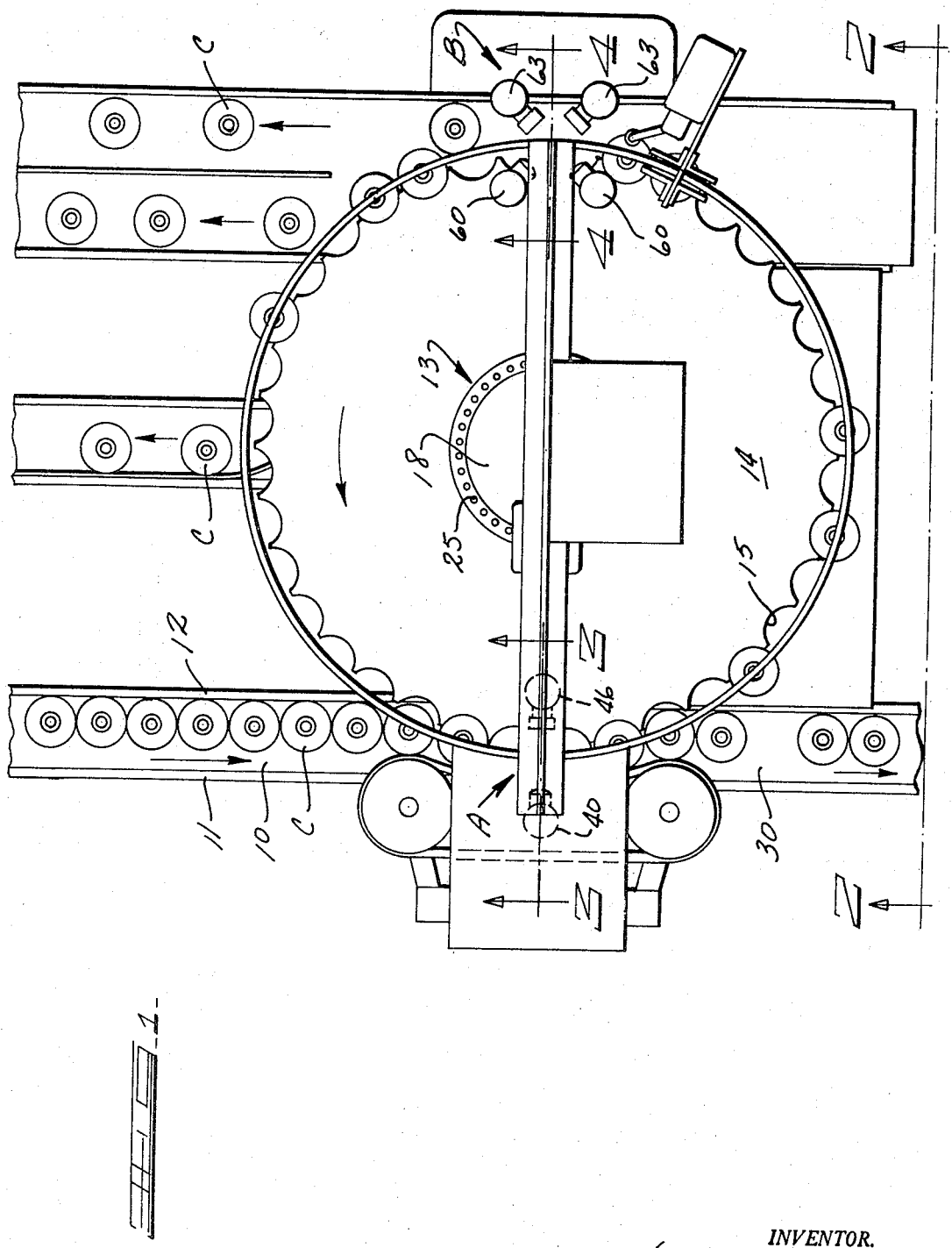
INVENTOR.
JAMES H. WYMAN
BY J. R. NELSON &
W. A. SCHAICH
ATTORNEYS

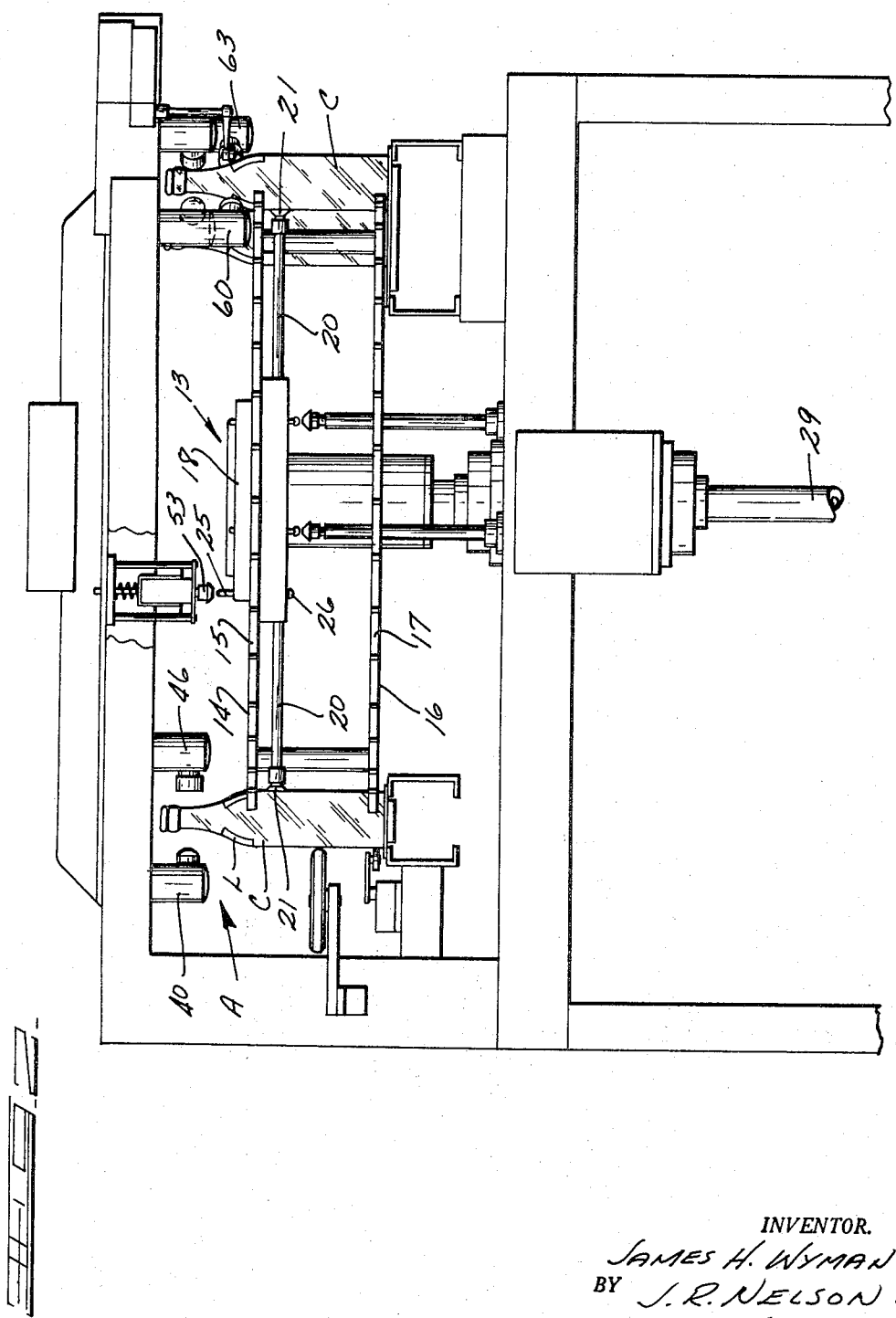

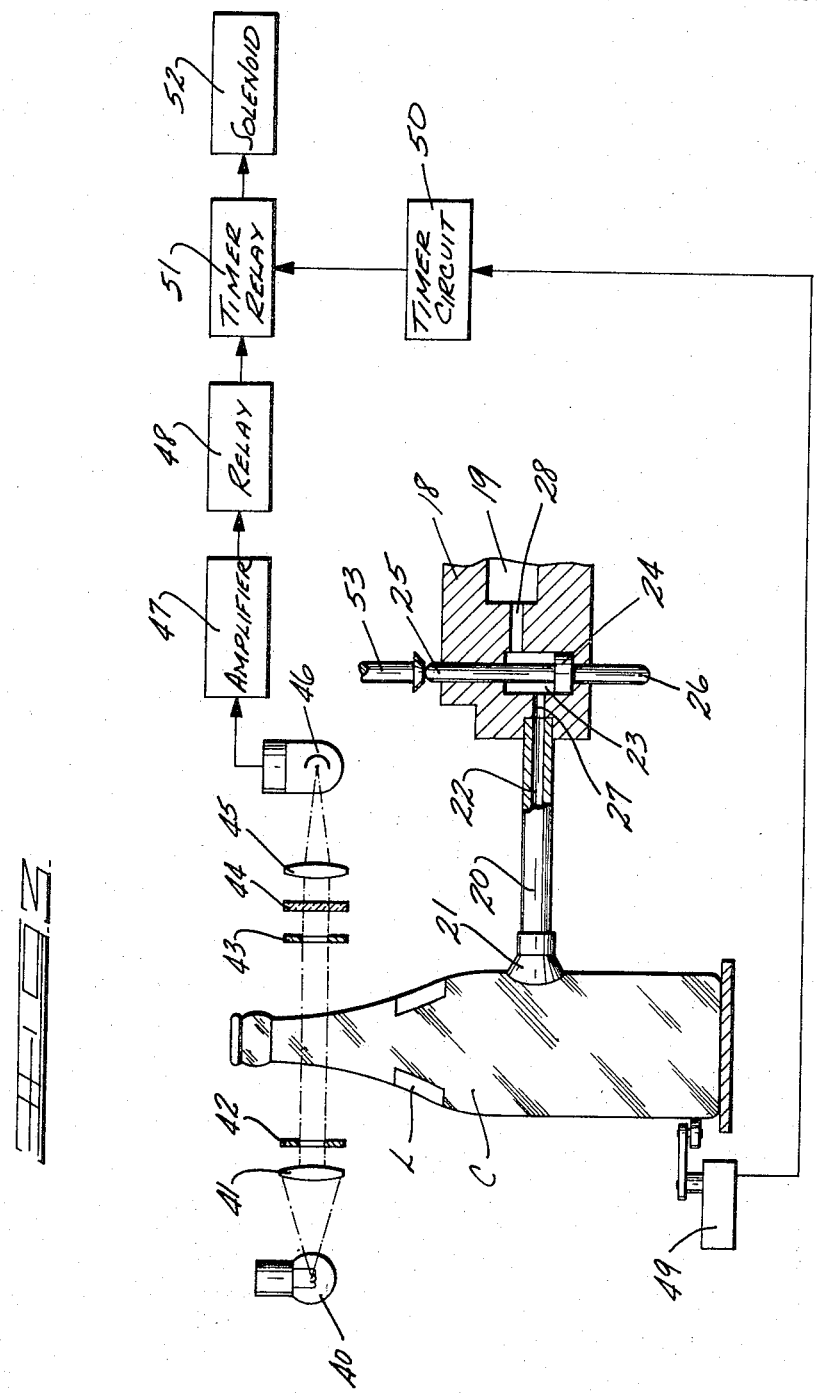

Nov. 7, 1967
J. H. WYMAN
3,351,198
GLASS CONTAINER SORTING
Filed Feb. 25, 1965
5 Sheets-Sheet 4
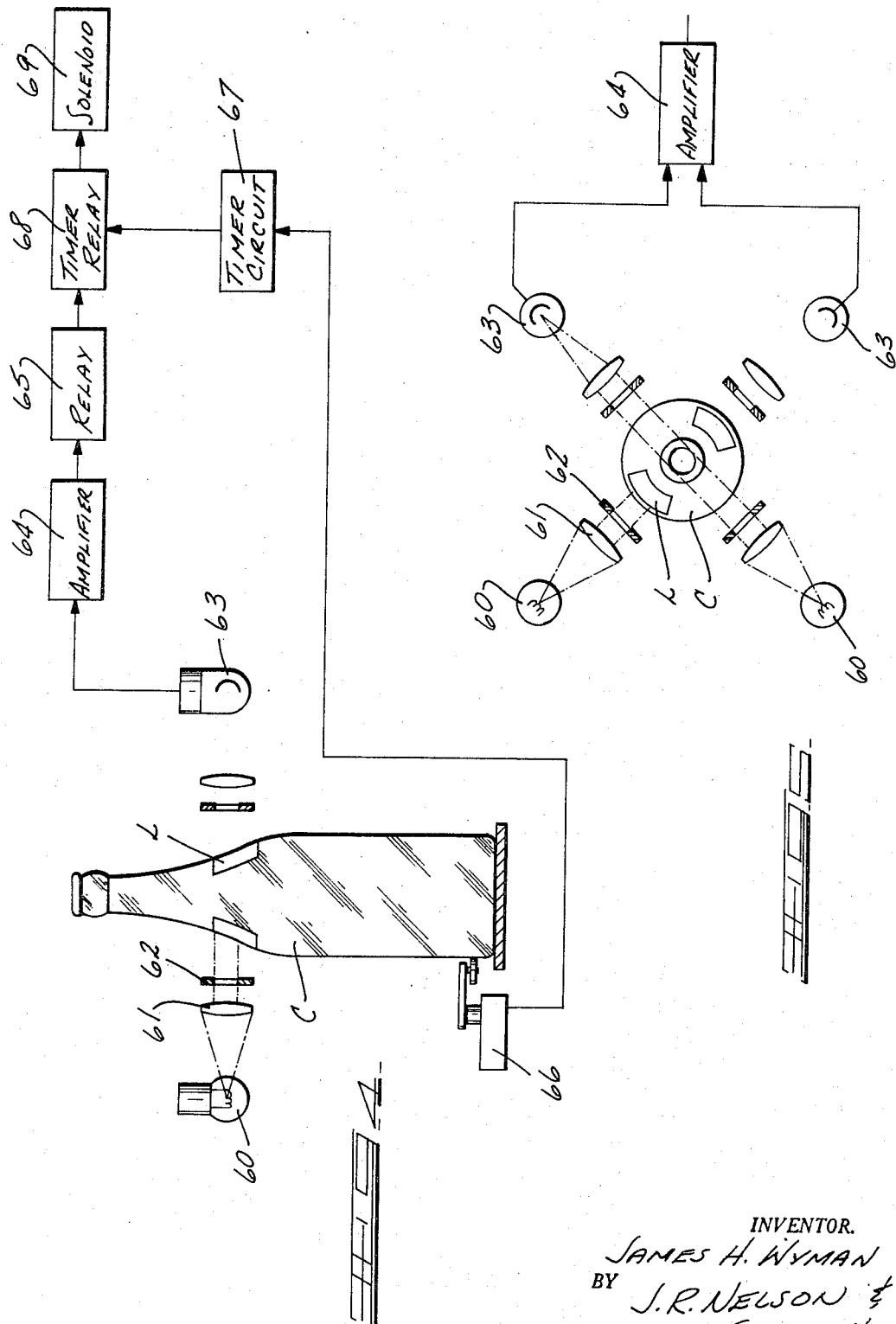
INVENTOR.
JAMES H. WYMAN
BY J. R. NELSON &
W. A. SCHACH
ATTORNEYS

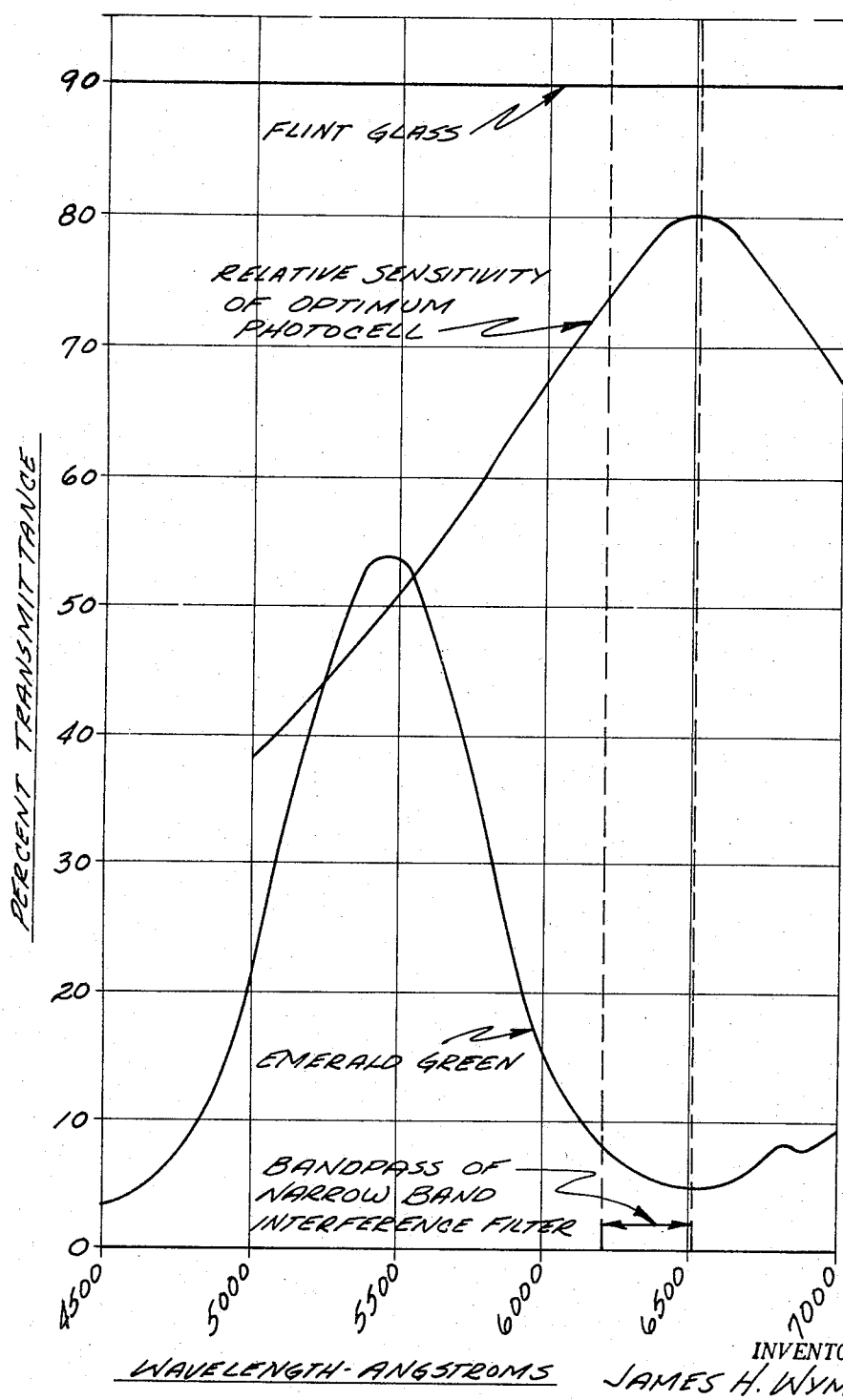

United States Patent Office 3,351,198
Patented Nov. 7, 1967

3,351,198
GLASS CONTAINER SORTING
James H. Wyman, Santa Barbara, Calif., assignor to Owens-Illinois, Inc., a corporation of Ohio
Filed Feb. 25, 1965, Ser. No. 435,186
2 Claims. (Cl. 209—111.6)

This invention relates to sorting articles and particularly to sorting glass containers in order to separate the containers depending upon either variations in light transmission properties due to their being made of different light absorbing glasses or variations in marking or labels.

In the prior patent to Drennan, 2,800,226, and the copending application of Drennan, Ser. No. 313,609, filed Oct. 3, 1963, now Patent No. 3,279,599, having a common assignee with the present application, there are disclosed and claimed apparatus for sorting a random assortment of articles, such as glass containers, to place all of the bottles of one kind on one conveyor, place all of the bottles of a second kind on a second conveyor, and so forth, until the bottles of the random assortment are sorted as desired.

It is an object of this invention to provide an improved apparatus of the type shown in the aforementioned patent and patent application including a method and apparatus for sorting a random assortment of containers depending upon the variations in light transmitting characteristics and variations in marking or labeling.

It is a further object of the invention to provide a method and apparatus which can be utilized separately in connection with individual conveyors for sorting a random assortment of containers depending upon the light transmission characteristics or marking and labeling.

In the drawings:

FIG. 1 is a fragmentary plan view of an apparatus embodying the invention.

FIG. 2 is a side elevational view taken along the line 2—2 in FIG. 1.

FIG. 3 is a partly diagrammatic part sectional view taken along the line 3—3 in FIG. 1.

FIG. 4 is a partly diagrammatic part sectional view taken along the line 4—4 in FIG. 1.

FIG. 5 is a partly diagrammatic plan view of the apparatus shown in FIG. 4.

FIG. 6 is a curve showing the percent transmission versus wave length of glasses, filters and light sensitive cells which may be utilized in performing the invention.

As used in this disclosure, the terms "containers" and "bottles" are intended to encompass glass and translucent containers, bottles, jars, or the like and other forms of refillable containers suitable for sorting.

Also, in this disclosure containers are mentioned as to "kind," "type" or "brand" and similar terms which are intended herein to distinguish one bottle from another by different light transmitting properties or by different marking or labeling.

Referring to the drawings, a random assortment or mixture of kinds of bottles to be sorted are advanced forward in single file or seriatim fashion on an infeed or inlet conveyor 10 leading into and through a first station A where a certain kind of bottle is to be sorted from the rest in a manner to be presently described. The infeed segment of the conveyor 10 leading to the station A may be provided with suitable parallel side rails or guides 11 and 12 which assures seriatim feeding of the bottles. The guides 11 and 12 are suitably spaced above the surface of conveyor 10 for engaging the sides of the jars and preventing jam-ups. A peripherally pocketed wheel is mounted on vertical shaft assembly 13 for rotation tangentially through the station A on the conveyor 10.

The wheel comprises an upper pocketed starwheel 14 having several bottle receiving pockets 15 about its periphery and a lower pocketed starwheel 16 having a like number of corresponding bottle receiving pockets 17. The upper wheel 14 is fastened to a hub 18 of the shaft assembly 13 and the lower wheel 16 is attached to the upper wheel 14. The hub 18 has an axial central bore (not shown) that communicates with a passageway terminating in a cylindrical vacuum chamber 19 defined by the hub 18 (FIG. 3).

Attached to the periphery of hub 18 are a plurality of pipes or hollow rods 20 each of which extend radially outwardly and carry a suction cup 21 at their outer end. There is a rod 20 and suction cup 21 for each pocket 15, 17 of the wheel and the suction cup is disposed such that it may sealingly engage the side of a bottle brought into its pocket 15, 17 on the wheel.

Communicating centrally of each cup 21 is a passage connected with the interior passage 22 of pipe 20. In the hub 18 opposite the inner end of each pipe 20 is a valve chamber 23 which houses a valve spool 24 that is shiftable axially in chamber 23. Each spool 24 has a valve stem that has an upper stem 25 which extends through an upper vertical guide bore in the hub, and a lower stem 26 extending vertically downwardly through a lower bore in hub 18. The lower stem 26 may conveniently have a loose fit with its upper bore in the hub; however, it is preferred the upper stem 25 fit snugly in its lower bore to avoid vacuum leakage and to frictionally retain the valve spool in a set position in opposition to gravity. Each of the upper stems 25 extends through a guide bore in the upper wheel 14 vertically aligned with the axis of the stem. The lower stem 26 depends in the annular space provided below the lower wheel 16. The valve chamber 23 is connected at one side by valve port 27 to the passage of the pipe 20. The opposite side of the chamber 23 is connected to vacuum chamber 19 by internal passage 28 formed radially in the hub 18. The vacuum is supplied by a source connected at pipe 29 and is applied continuously into the chamber 19 of the hub 18, and from there is connected to each of the several valve chambers 23 about the hub. When the valve spool 24 is in the "down" position as shown in FIG. 3, the vacuum is connected to the interior of the suction cup 21, which attaches the bottle it engages to the starwheel. The manner of manipulating the valves will be presently described. When the valve spool 24 is in the "up" position, as shown at the right-hand side of FIG. 3, the vacuum is disconnected from the suction cup 21 and the latter vented to atmosphere by the loose fit of the lower stem 26 in the hub adjacent the valve chamber 23. Thusly, the suction cup releases its hold on the bottle and the latter is free to leave the starwheel.

The above described apparatus is more completely shown and described in the aforementioned patent application Ser. No. 313,609, now Patent No. 3,279,599.

Referring to FIG. 1, at station A, the bottles or containers are successively sorted for differences in light transmission characteristics. For example, it may be desirable to separate bottles which are made of emerald green glass from containers which are made from flint glass. In accordance with the invention, a light beam is directed through the bottle and, if the bottle has different light transmission characteristics than those desired, for example if it is made of emerald green glass rather than flint glass, it tends to transmit light only in certain regions of the spectrum. The different transmission is sensed by light sensitive means and is caused to sort the bottle from the remaining bottles.

As shown in FIG. 6, flint glass has light transmission characteristics which comprise substantially complete transmission through wave lengths ranging from 4500 to 7000 Angstroms. On the other hand, emerald green glass has different light transmission characteristics. It can thus be seen that emerald green glass has its major transmission in the range from about 5000 to 5800 Angstroms. Thus, a typical emerald green glass may have C.I.E. values at a thickness of ten millimeters comprising brightness 33.95 percent, purity 67.8 percent and a dominant wave length of 5560 Angstroms (millimicrons). By utilizing an interference narrow band filter between the beam and the light sensitive means, the light transmitted by the emerald green glass will be absorbed and only light in the range of optimum sensitivity of the light sensitive means will be transmitted. This is shown by the vertical broken lines in FIG. 6.

As shown in FIG. 3, at station A, a beam of radiant energy to which the article is transparent, such as an incandescent light bulb 40, is collimated by lens 41 and directed through a mask 42 and through the upper end of the neck end of the bottle C as it passes the station. The light beam then passes through an aperture mask 43 and an interference narrow band filter 44, condensing lens 45 and is directed against a light sensitive cell 46. The filter 44 preferably has a narrow band pass represented by the vertical broken lines in FIG. 6 so that the filter permits only light to pass which is in the range of optimum sensitivity of the light sensitive cell represented by the curve in FIG. 6 that has a dominant wave length of about 6500 Angstroms. The filter 44 thus insures that the dominant wave length of light transmitted by the bottle which is to be sorted does not pass to the light sensitive cell.

By this arrangement, if the bottle C is made of a different type of glass having dominant light transmission characteristics which do not lie in the narrow band pass of filter 44, the container will have minimum transmission in the range of the filter 44 and thereby fail to energize the light sensitive cell 46. This creates a signal which is amplified by amplifier 47 and passes to relay 48. If at the same time a container C is properly located at the inspection station, a micro-switch 49 is actuated to energize the timer circuit 50 and produce a time signal that is directed to a timer relay 51. If the signal from relay 48 occurs during the time interval of the signal from timer circuit 50, then a solenoid 52 is energized to cause the rod 53 to move downwardly and release the suction on the suction cups thereby permitting the container to move along the conveyor 30.

At station B, the containers are successively inspected for presence of markings or labels. In order to achieve this, as shown in FIGS. 4 and 5, a plurality of beams, such as incandescent light sources 60, are collimated by lenses 61 and pass horizontally through aperture masks 62 across another portion of the neck of the container C which may bear a mark or label L. The light beams from the sources 60 normally pass to light sensitive cells 63. However, if a label L is present and the container bearing the label is to be sorted from the remaining containers, the light beams are interrupted. Interruption of the passage of light to any of the cells 63 causes a signal which is amplified by amplifier 64 and energizes the relay 65. As at the previous station, if a container C is present and in proper inspecting position, a micro-switch 66 is energized to cause a timer circuit 67 to be energized and create a timing signal that is passed to timer relay 68. If the signal from relay 65 occurs during the interval that a timing signal is formed by the timer circuit 67, another solenoid 69 is energized to release the suction on the container C and permit it to pass to another conveyor.

It can thus be seen that there has been provided a method and apparatus for inspecting containers to sort the containers depending upon the light transmitting characteristics thereof and the position of the marking or label thereon.

I claim:

1. In the method of sorting articles wherein the articles are engaged by suction cups and moved in a predetermined path through a plurality of stations and the articles are inspected at each of said stations and released from said suction cups in the event that they do not meet predetermined standards, each of the types of articles to be sorted having light transmitting characteristics of different dominant wave lengths, the improvement comprising
    directing a beam of light through a portion of each article as it passes a first station,
    said beam having a spectrum comprising wave lengths such that each of the types of articles to be sorted is transparent to at least some of the wave lengths,
    directing the light transmitted by said article at said first station against a light sensitive cell having a sensitivity range with predetermined dominant wave length,
    filtering the light so that light may pass to said cell only at substantially the same wave length as the dominant wave length of said cell,
    and sorting an article from the remaining articles when the light transmitted therethrough has a dominant wave length that does not energize said cell,
    directing a plurality of light beams to which the articles to be sorted are transparent through another portion of the articles to be sorted as they pass another station,
    sensing a diminution of predetermined magnitude of the light passing through said article due to the presence of a mark or label,
    and sorting said article from the remaining articles when the diminution of predetermined magnitude occurs.

2. In an apparatus for sorting articles comprising means for carrying a series of suction cups in motion along a closed path passing through a first and a plurality of subsequent stations, a first conveyor means for carrying articles sequentially along a path bringing the articles into engagement with said suction cups at said first station, a vacuum source, means for selectively connecting said vacuum source to said suction cups passing through said first station and maintaining the vacuum of article engaging suction cups moving along said closed path beyond said first station, a plurality of other conveyor means each passing through said one of the other of said subsequent plural stations, means for releasing the vacuum of selected cups passing through said other stations to release the article onto said other conveyor means, each of the types of articles to be sorted having light transmitting characteristics of different dominant wave lengths of light transmitted therethrough, the improvement comprising
    means for directing a beam of light through said articles,
    said beam having a spectrum comprising wave lengths such that each of the types of articles to be sorted is transparent to at least some of the wave lengths,
    means at said station in the path of said light beam and responsive to the passage of said beam thereto,
    narrow pass filter means interposed in the path of said beam for transmitting the portion of the light beam to which the light sensitive device is primarily sensitive,
    means for creating a signal when the amount of light transmitted to said light sensitive means passes below a predetermined standard,
    means for directing a plurality of beams of light through another portion of the container at another station,
    light sensitive means in the path of said beams,
    means for creating a second signal in response to diminution of light from one of said plurality of beams due to the presence of a mark or label,
    and sorting means for sorting a respective article from the remaining articles in response to a signal from one of said signal creating means.

References Cited

UNITED STATES PATENTS

| | | | |
|---|---|---|---|
| 2,137,187 | 11/1938 | Stoate | 88—14 |
| 2,798,605 | 7/1957 | Richards | 88—14 |
| 2,945,588 | 7/1960 | Fenn et al. | 209—111.7 |
| 2,982,408 | 5/1961 | Blackburn et al. | 209—111.6 |
| 3,159,279 | 12/1964 | Sloan et al. | 209—111.5 |
| 3,228,520 | 1/1966 | Schneider | 209—111.6 |

ROBERT B. REEVES, *Primary Examiner.*